United States Patent [19]

Jannotta

[11] Patent Number: 4,821,022
[45] Date of Patent: Apr. 11, 1989

[54] FLOAT ASSEMBLY CHECKING SYSTEM

[76] Inventor: Louis J. Jannotta, 7940 Teton Rd., Orland Park, Ill. 60462

[21] Appl. No.: 177,093

[22] Filed: Apr. 4, 1988

[51] Int. Cl.$^4$ .................... G08B 29/00; G01F 23/10
[52] U.S. Cl. .................... 340/514; 340/623; 340/624; 73/309; 73/308; 73/307; 73/322; 73/DIG. 5; 73/452; 200/84 C
[58] Field of Search ............... 340/514, 612, 618, 623, 340/624, 625; 73/305, 307, 308, 314, 322, 448, 452, 453, DIG. 5, 451; 200/84 R, 84 C, 84 A

[56] References Cited

U.S. PATENT DOCUMENTS 4,321,590  3/1982  Ishikawa et al. .................... 340/624
4,500,761  2/1985  Kubota et al. ........................ 73/308
4,626,700 12/1986  Tanaka et al. ........................ 73/308

FOREIGN PATENT DOCUMENTS 0119017  9/1980  Japan ..................................... 73/308
1295833 11/1972  United Kingdom ................ 340/624

Primary Examiner—Donnie L. Crosland
Attorney, Agent, or Firm—Frank J. Uxa

[57] ABSTRACT

An apparatus for checking the workability of a float assembly used to determine the level of liquid in a vessel is disclosed and comprises: a float extension associated with the float of the float assembly and movable when the float assembly is in working order in response to the movement of the float caused by changing the level of liquid in the vessel; a sensor located in spaced relation to the float extension and acting to provide a signal when the float extension is in a predetermined position; and a checking system capable of being activated to move the foat extension into the predetermined position without regard to the level of liquid in the vessel when the float assembly is workable.

19 Claims, 2 Drawing Sheets

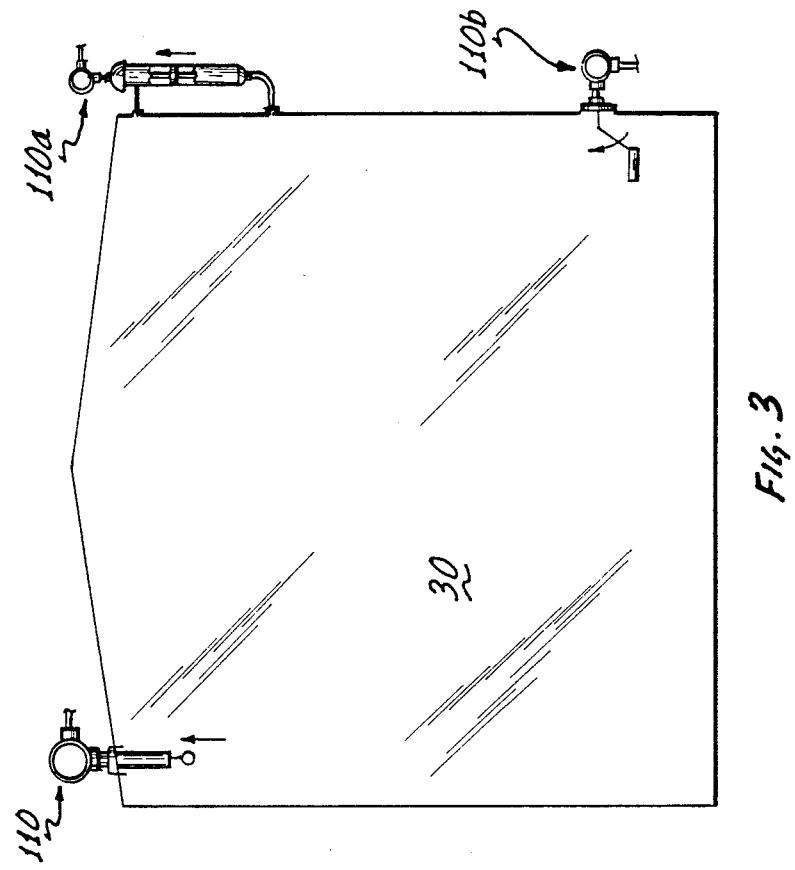
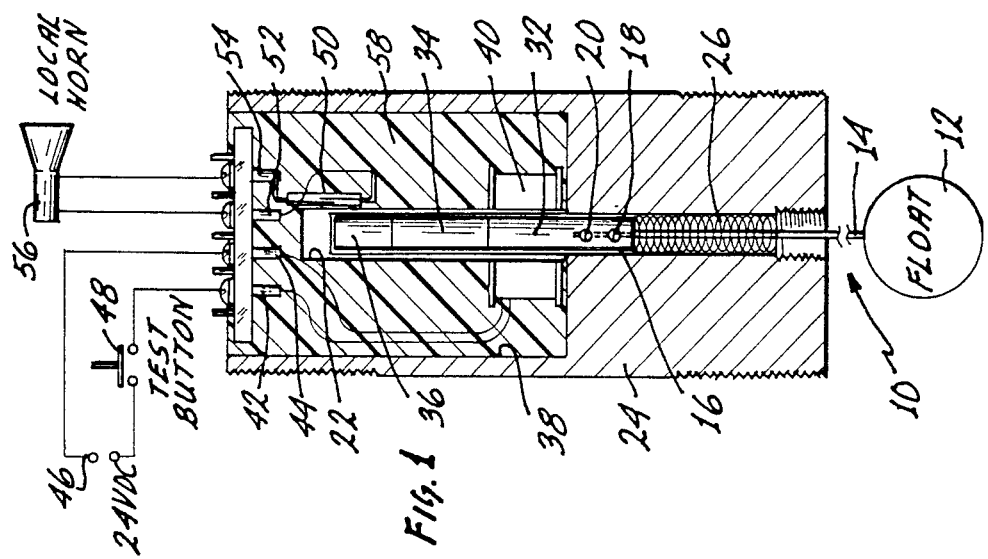

FLOAT ASSEMBLY CHECKING SYSTEM

BACKGROUND OF THE INVENTION

This invention relates to an apparatus or system for checking a float assembly used to determine liquid level. More particularly, the invention relates to a system for checking the workability of a float assembly used to determine the level of liquid in a vessel e.g., storage tank and like.

Many modern day applications requiring storage tank operations involve obtaining information from a great number of tanks. For example, fuel tanks are often clustered in what are called "tank farms" with each "farm" having from about ten to about one hundred or more tanks. Good tank management requires that the amount or level of liquid in each tank be closely monitored. Such monitoring often involves the use of a float and float assembly which moves in response to changes in the level of liquid in the tank. In many instances, a liquid level alarm is incorporated into the level control system of individual tanks. That is, a predetermined point is provided at which a signal, e.g., an audible or visual signal, is provided indicating that the level of liquid in the tank is either too low or too high. This signal is often called an alarm.

The floats and float assemblies used in these tanks must be quite durable since they must continue to function over long periods of time. Such floats and float assemblies are often subject to deterioration because, for example, of the corrosive or otherwise harmful nature of the liquid in the tank and the environment surrounding the tank. In order to ensure that correct liquid level data are being obtained, periodic visual inspections of the floats and float assemblies have been required in order to ensure that such components continue to be workable i.e., functional to provide satisfactory liquid level data. Such visual inspections are quite labor intensive and time consuming, particularly when a large number of tanks are involved. It would be advantageous to provide a system whereby the workability of such floats and float assemblies can be monitored without the need for visually inspecting such floats and float assemblies.

SUMMARY OF THE INVENTION

An apparatus for checking the workability of a float assembly used to determine the level of liquid in a vessel has been discovered. In one broad aspect, this apparatus comprises extension means or a float extension which is associated with the float of the float assembly and is moveable when that float assembly is in working order, i.e., is workable in response to the movement of the float caused by a change in the level of liquid in the vessel; sensor means located in spaced relation to the float extension and acting to provide a signal when the float extension is in a predetermined position; and checking means or checking system capable of being activated to move the float extension into the predetermined position without regard to the level of liquid in the vessel when the float assembly is workable. In another broad aspect of the invention, an apparatus for checking the workability of a plurality of float assemblies used to determine the level of liquid in a vessel, is provided. Such apparatus comprises a plurality of each of the extension means, sensor means and checking means as described above, and further includes a control means associated with the plurality of checking means. This control means is capable of automatically activating each of the checking means.

The present invention provides substantial benefits. For example, the floats and float assemblies involved in monitoring liquid levels can themselves be monitored or checked for workability without visually inspecting such components. One can, by activating the checking system, determine whether or not the float or float assembly is working by whether or not a signal is provided. In one particularly useful embodiment, the present system can be linked to a control means e.g., a central processing unit, such as is conventionally used to monitor or manage large tank farms, to very easily monitor the workability of the float and float assembly, preferably a plurality of such floats and float assemblies. In short, the present system provides substantial aid in properly and cost effectively managing the operation of liquid containing vessels, such as storage tanks and the like.

The term "float" as used herein includes both floats which are normally located at or near the surface of the liquid in the vessel, and displacers which are normally located below the surface of the liquid in the vessel. In either case, the location of the float or displacer in the vessel moves in response to changes in the level of liquid in the vessel.

The checking system is capable of being activated to move the float extension into a predetermined position, as described. Preferably, the checking system is not physically attached or secured to the float extension. This feature is particularly useful where, as is preferred, the checking system is powered by electrical energy. Thus, it is possible, and preferred, that the checking system be located outside the fluid space of the vessel, i.e., outside the space in the vessel into which liquid in the vessel, or its associated vapor, can flow. Effectively isolating the checking system from the fluid space provides substantial advantages, including enhanced safety, and avoids exposing the checking system to the environment within the fluid space.

The checking system may be structured to be activated manually and/or automatically, as desired. By "manual" activation is meant that a human directly acts on the checking system to cause activation. By "automatic" activation, is meant that the checking system is activated without any direct human intervention. For example, a human may pre-program a control system, described hereinafter, to check the workability of a float assembly on a pre-set schedule. The control system, following this pre-set schedule, is an example of "automatic" activation of the checking system. On the other hand, an example of "manual" activation is where the human manually overrides the control system to check on the workability of the float assembly at a time other than the pre-set time.

The checking system may be configured or structured in any suitable manner capable of functioning as described herein. In one embodiment, the checking means preferably includes a solenoid coil located around at least a portion of the float extension. In this embodiment, the float extension is structured to be responsive, e.g., to be movable to the predetermined position when the float assembly is workable, to the magnetic force created when the solenoid coil is activated, i.e., when electrical current is caused to flow through the solenoid coil. In this embodiment, a portion of the float extension is preferably ferromagnetic, in particular made of iron.

The solenoid coil is connected to a source of electrical energy, such as a D.C. power source, e.g., storage battery and the like. A switch is preferably included in the coil-power source circuit so that the coil is activated only when desired.

The use of a checking system including a solenoid coil, e.g., as described herein, is very advantageous in the present invention. For example, the solenoid coil/power source combination can be safely located outside the fluid space of the vessel. Also, the magnitude of the magnetic force produced by the activated solenoid coil can be specifically tailored or customized to move the float extension means to a predetermined position when the float assembly is workable and to not move the float assembly to such predetermined position when the float assembly is struck or otherwise inoperative.

The sensor means may have any suitable construction and structure capable of functioning as described herein, e.g., to provide a signal when the float extension means is in the predetermined position. The sensor may, and preferably does, perform a dual function. That is, it is preferred that the sensor act to provide a signal when the float assembly is being checked for workability and when the liquid in the vessel is at a pre-set high alarm level or a pre-set low alarm level. In a more preferred embodiment, the predetermined position of the float extension is such that when such position is attained in response to the level of liquid in the tank, a level alarm signal is provided.

In a particularly useful embodiment, the sensor includes a magnetic reed switch, and the float extension means acts to open or close the reed switch as the float extension moves into the predetermined position. For example, the portion of the float extension which moves into proximity to the reed switch preferably has sufficient magnetic force to open or close the switch as the float extension moves into the predetermined position. Once the float extension is moved out of the predetermined position, e.g., by deactivating the checking system, the reed switch reverts to its original position (closed or opened) and the signal indicating a workable float assembly is ceased.

The present system preferably further comprises an indicator means which is associated with the sensor and acts to provide an audible and/or visual manifestation in response to the signal from the sensor. For example, the indicator means may include a horn which is activated upon the closing of the reed switch of the sensor. Alternately, the indicator means may include a visual display system which is activated to provide a written message and/or a display on a cathode ray tube (CRT) or a liquid crystal display (LCD) upon the closing of the sensor's reed switch. Of course, the indicator means can include the horn, and the visual display system to provide both audible and visual manifestations of the signal from the sensor.

The present invention is applicable to checking the float assembly associated with a single vessel, and such application is expressly included within the scope of the present invention. However, the invention is particularly applicable in situations were it is desired to periodically check the workability of a plurality of float assemblies, e.g., associated with a plurality of storage tanks and the like.

The present apparatus preferably further comprises control means associated with the checking means and acting to activate, more preferably automatically activate, the checking means. In a particularly useful embodiment, the control means acts at predetermined, pre-set or pre-programmed, intervals of time to periodically, and preferably automatically, activate the checking means. If a plurality of checking means are to be activated, the present control means is preferably capable of automatically activating each of the checking means individually, e.g., in a pre-set or pre-programmed sequence.

The control means may be structured and configured in any suitable manner to function as described herein. The control means preferably includes a microprocessor-based system, such as systems currently in commercial use to monitor and manage storage tanks. Such systems can be programmed to activate the checking means at pre-determined times, and to collect and display signals from the sensors. A microprocessor-based system especially useful as the control means in the present invention is sold by L & J Engineering, Inc., under the trademark MCG-7000. Preferably, the control means performs its function or functions automatically, and more preferably is in electronic communication with the checking means and the sensor means of the present apparatus.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is schematic view, partly in cross-section, of one embodiment of the float checking system of the present invention.

FIG. 3 is a schematic view, partly in cross-section, showing various locations on a liquid storage tank where floats and the present float checking systems can be utilized.

DETAILED DESCRIPTION OF THE DRAWINGS

Figure 2:
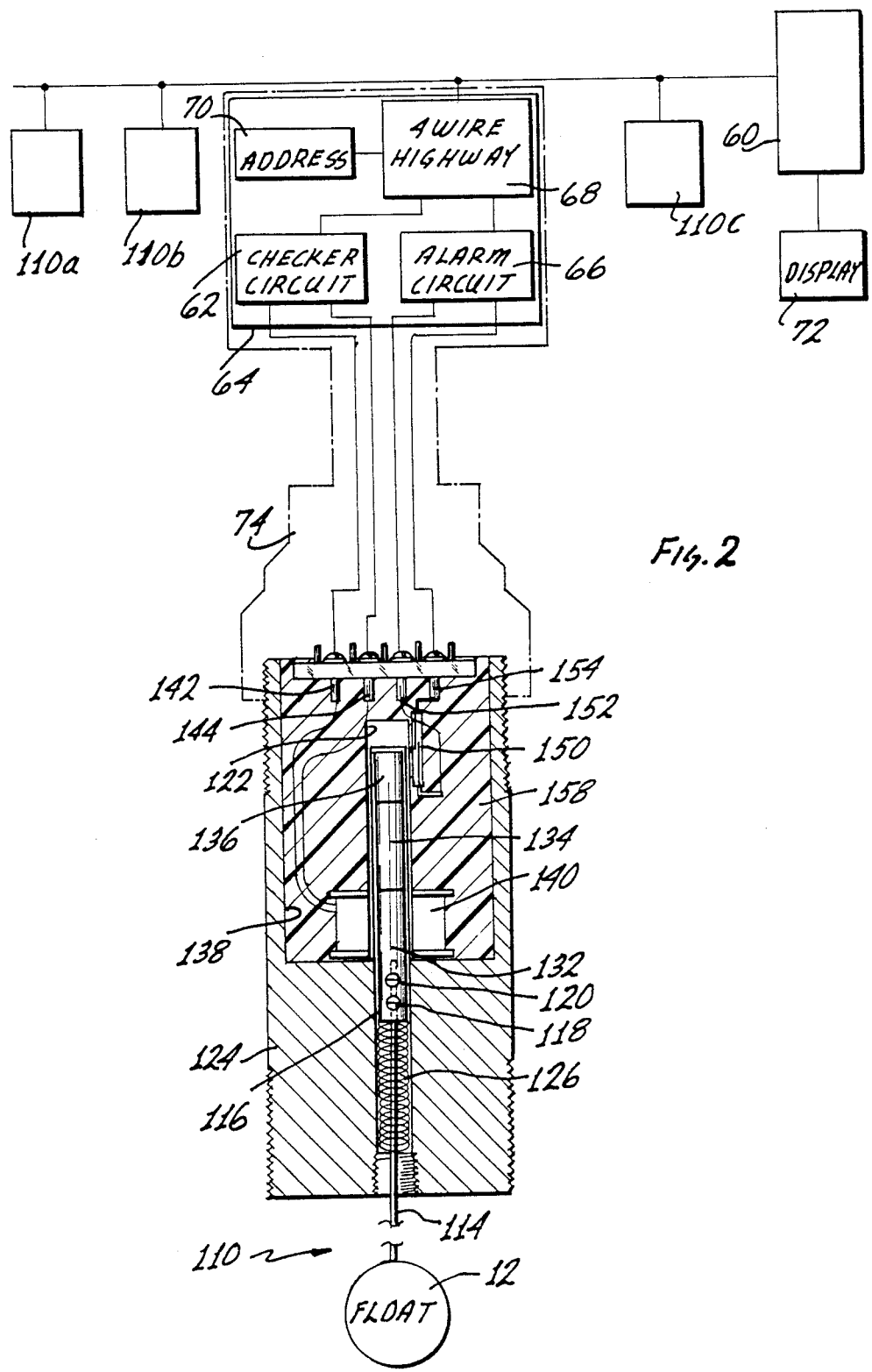
FIG. 2 is a schematic view, partly in cross-section, of another embodiment the float checking system of the present invention.

Referring now to FIG. 1, a float assembly, shown generally at 10, includes a float 12, a rod 14 and a rod extension 16. Rod 14 is jointed to float 12, and is connected to rod extension 16 by means of bolts 18 and 20. Rod 14 extends up into a passage 22 which is located in a fitting 24. Rod extension 16 is located entirely in passage 22. Also located in passage 22 is a spring 26 which is held in place in fitting 24 below and in contact with rod extension 16.

Fitting 24 is threaded, and is fitted into a liquid storage tank, such as tank 30 shown in FIG. 2. With fitting 24 thus in place, float 12 moves in response to the movement or change in liquid level in the tank 30. By monitoring the change in position of float 12, one can monitor the change in liquid level in the tank.

Rod extension 16 includes three (3) portions which are secured, e.g., bonded, together. Lower portion 32 is made of iron, middle portion 34 is made of nylon and upper portion 36 is made of magnetic iron.

Fitting 24 includes a large upwardly extending cavity 38 which is isolated from passage 22. In other words, cavity 38 is not in fluid communication with passage 22. A solenoid coil 40 is placed in cavity 38 around the lower portion 32 of rod extension 16. Solenoid coil 40 is electrically joined through connectors 42 and 44 to a 24 volt (DC) storage battery 46. Also included in this circuit is a push button switch 48.

A magnetic reed switch 50 is placed in cavity 38 in proximity to the top of passage 22. Reed switch 50, which is normally open, is placed relative to upper portion 36 of rod extension 16 so that as upper portion 36 moves up toward reed switch 50, the magnetic force of upper portion 36 causes reed switch 50 to close. As upper portion 36 moves down passage 22, reed switch 50 returns to its normal open position.

Reed switch 50 is electrically joined through connectors 52 and 54 to a local horn 56 which emits an audible noise when reed switch 50 is closed. Local horn 56 has its own power source.

After all the above-noted components are properly placed into cavity 38 and all the above-noted electrical connections are properly made, cavity 38 is filled with an electrically insulating material 58, such as an epoxy.

Float assembly 10 is checked for workability as follows. With float assembly 10 in place in association with tank 30, as described above, and the liquid level in 30 below the pre-set high alarm level, a human operator manually presses push-button switch 48 which completes the circuit between solenoid coil 40 and storage battery 46. Thus, electrical energy from storage battery 46 is provided to solenoid coil 40 which activates solenoid coil 40 and creates a magnetic field. Solenoid coil 40 is situated and configured so that, if float assembly 10 is in working order, the magnetic field created moves rod extension 16 up in passage 22 to a position where reed switch 50 moves from its normally open position to the closed position. Therefore, if float assembly 10 is in working order, pushing push button switch 48 will ultimately cause a noise to be emitted from local horn 56. If no such sound is emitted, float assembly 10 is not working properly, and remedial maintenance is required.

The combination of float assembly 10, reed switch 50 and local horn 56 can act as a high level alarm system even when the workability checking function is not being used. Thus, as the level of liquid in tank 30 rises to a pre-set high point, rod extension 16 is forced up in passage 22 to the point where reed switch 50 closes, thus causing local horn 56 to emit a sound warning the operators of the high liquid level in tank 30.

Although the present invention is useful with a single, isolated vessel or storage tank, it has particular applicability when used in conjunction with a plurality of storage tanks. Such a system is schematically shown in FIG. 2 in which components which correspond to components described with regard to float assembly 10 are indicated by reference numerals increased by 100. Also, only one float assembly 110 is shown in detail, with the other float assemblies 110a, 110b and 101c being substantially identical to the one shown in detail. Therefore, float assemblies 110a, 110b, and 110c are only shown schematically.

Referring now to FIG. 2, a float assembly 110 includes many of the same components as described previously with regard to float assembly 10. Therefore, unless otherwise expressly stated, float assembly 110 is structured and functions similarly to float assembly 10.

The major difference between float assembly 110 and float assembly 10 is that float assembly 110 is automatically controlled and is one of at least four (4) float assemblies linked together by a control unit 60.

Solenoid coil 140 is joined through connectors 142 and 144 to checker circuit 62 which is located on a printed circuit board 64. Reed switch 150 is joined through connectors 152 and 154 to alarm circuit 66 which is also located on printed circuit board 64. Both checker circuit 62 and alarm circuit 66 are in electronic communication with control unit 60 through a 4-wire highway module 68 which is located on a printed circuit board 64.

The wiring/electronic details of checker circuit 62, alarm circuit 66, printed circuit board 64 module 68 and control unit 60 are not a part of the present invention. Further, the details of how control unit 60 is linked to or communicates with float assemblies 110, 110a, 110b, and 110c is conventional and well known in the art. See, for example, Jannotta U.S. Pat. No. 4,275,382 which is hereby incorporated in its entirety by reference herein. In view of the above, a detailed description of the above-noted wiring/electronics and linking/communication is not presented here.

In general, control unit 60, such as a microprocessor-based system sold by L & J Engineering, Inc. under the trademark MCG 7000, is pre-programmed to periodically check the workability of each of the float assemblies 110, 110a, 110b and 110c. A single MCG 7000 Control unit can monitor from 1 to 127 float assemblies. As the time for checking the workability of float assembly 110 approaches, control unit 60 sends out a checking signal specifically addressed to float assembly 110. This checking signal passes into 4-wire highway module 68 where it is itself checked against an address circuit 70 which is located on printed circuit board 64. If the "address" included in the checking signal from control unit 60 matches the address in address circuit 70, the checking signal is allowed to pass to checker circuit 62 to activate solenoid coil 140. If float assembly 110 is in working order, rod extension 116 will move up to close reed switch 150, which, in turn, will activate alarm circuit 66 to send a signal back through 4-wire highway module 68 to control unit 60. If no signal is provided to control unit 60, float assembly 110 is suspect and should be visually inspected to determine if it is in working order.

Control unit 60 is associated with a liquid crystal display 72 which provides a visual representation of the signals received by central unit 60. If desired, display 72 can be replaced by a printer device to provide a permanent record of the workability checks of float assembly 110. Further, if desired, a device for providing an audible manifestation of the signal received by control unit 60 can be provided in conjunction with control unit 60. Alternately, if desired, a local sound producing device, such as local horn 56, can be located in conjunction with alarm circuit 66 to provide a localized sound signal if float assembly 110 is in working order.

The other float assemblies 110a, 110b, and 110c are exposed to the signal which is addressed specifically to float assembly 110. However, as this signal is checked by the address circuits associated with these other float assemblies, 100a, 100b, and 100c, the signal is not permitted to proceed further to activate the corresponding solenoid coils because the checking signal is not addressed properly for any of these other float assemblies. Similarly, when a checking signal is addressed specifically for float assembly 110b, address circuit 70 does not permit this signal to activate solenoid coil 140 of float assembly 110.

Control unit 60 is preferably programmed so that the checking schedule may be interrupted in the event that an alarm condition, e.g., high liquid level alarm, is being indicated by any of the float assemblies 110, 110a, 110b, 110c, etc. If such an alarm condition exists, a signal is immediately passed to control unit 60 and display 72 so that corrective action can be taken. For example, if float assembly 110 is monitoring the liquid level in tank 30, and this level rises to the alarm level, rod extension 116 moves up to close reed switch 150. This, in turn activates alarm circuit 66 to provide a alarm signal to control unit 60 and display 72.

There are other conventional ways in which float assemblies 110, 110a, 110b, 110c, etc., can be linked together with control unit 60. For example, each of the float assemblies can be linked directly to control unit 60, thus avoiding the need for 4-wire highway module 68 and address circuit 70.

A housing 74 is schematically shown in FIG. 2. Housing 74 acts to protect the top portion of float assembly 110, and in particular printed circuit board 64, from the elements.

A single float assembly 110 can be automatically controlled by control unit 60, if desired.

FIG. 3 depicts storage tank 30 associated with three (3) of the present checking systems disposed at different locations. Thus, float assembly 110 can be located in the roof of tank 30, while float assemblies 110a and 110b are associated with the side of tank 30. As schematically shown in FIG. 3 with regard to float assembly 110b, the present checking system is applicable even where the float is movable in the vertical direction and the rod extension is movable in the horizontal direction.

The present invention provides a quick, effective and reliable way to check the workability of float assemblies used to monitor liquid levels in vessels, such as storage tanks. Such check is accomplished without a time consuming, and labor intensive visual inspection of such float assembly. Further, the present system is applicable where only one tank is involved or where a whole tank farm is involved.

While this invention has been described with respect to various examples and embodiments, it is to be understood that the invention is not limited thereto and that is can be variously practiced within the scope of the following claims.

The embodiments of the present invention in which an exclusive property or privilege is claimed are as follows:

1. An apparatus for checking the workability of a float assembly used to determine the level of liquid in a vessel comprising:
    extension means associated with the float of said float assembly and being movable when said float assembly is in working order in response to the movement of said float caused by changing the level of liquid in said vessel;
    sensor means located in spaced relation to said extension means and acting to provide a signal when said extension means is in a predetermined position; and
    checking means capable of being activated to move said extension means into said predetermined position without regard to the level of liquid in said vessel when said float assembly is workable.

2. The apparatus of claim 1 wherein said checking means is not physically attached or secured to said extension means.

3. The apparatus of claim 1 wherein said checking means is powered by electrical energy.

4. The apparatus of claim 3 wherein said checking means is structured to be activated manually or automatically.

5. The apparatus of claim 3 wherein said checking means includes a solenoid coil located around at least a portion of said extension means.

6. The apparatus of claim 5 wherein said checking means further includes an electrical energy source to energize said solenoid coil.

7. The apparatus of claim 1 which further comprises indicator means associated with said sensor means and acting to provide at least one of an audible manifestation is response to said signal and a visual manifestation is response to said signal.

8. The apparatus of claim 1 which further comprises control means associated with said checking means and acting to activate said checking means.

9. The apparatus of claim 8 wherein said control means acts at predetermined intervals of time to periodically activate said checking means.

10. The apparatus of claim 8 wherein said control means is associated with a plurality of said checking means and is capable of automatically activating each of said checking means individually.

11. The apparatus of claim 1 wherein said sensor means includes a magnetic reed switch, and at least a portion of said extension means is magnetic so that said reed switch is opened or closed as said extension means is moved into said predetermined position.

12. The apparatus of claim 1 wherein said sensor means and said checking means are located outside the fluid space in said vessel.

13. An apparatus for checking the workability of a plurality of float assemblies used to determine the level of liquid in a vessel comprising:
    a plurality of extension means each one of which is associated with the float of a different one of said float assemblies and is movable when said float assembly is in working order in response to the movement of said float caused by changing the level of liquid in said vessel;
    a plurality of sensor means each one of which is located in spaced relation to one of said extension means and acts to provide a signal when said extension means is in a predetermined position;
    a plurality of checking means each one of which is capable of being activated to move said extension means into said predetermined position without regard to the level of liquid in said vessel when said float assembly is workable; and
    control means associated with said plurality of checking means and is capable of automatically activating each of said checking means.

14. The apparatus of claim 13 wherein said control means acts at predetermined intervals of time to periodically activate each said checking means sequentially.

15. The apparatus of claim 13 wherein each of said checking means is powered by electrical energy.

16. The apparatus of claim 15 wherein each of said checking means includes a solenoid coil located around at least a portion of said extension means.

17. The apparatus of claim 13 which further comprises indicator means associated with said plurality of sensor means and acting to provide an audible or visual manifestation in response to one or more of said signals.

18. The apparatus of claim 13 wherein each of said sensor means includes a magnetic reed switch, and at least a portion of each of said extension means is magnetic so that said reed switch is opened or closed as said extension means is moved into said predetermined position.

19. The apparatus of claim 13 wherein each of said sensor means and each of said checking means are located outside the fluid space of said vessel.

* * * * *

UNITED STATES PATENT AND TRADEMARK OFFICE
CERTIFICATE OF CORRECTION

PATENT NO. : 4,821,022
DATED : April 11, 1989
INVENTOR(S) : Louis J. Jannotta

It is certified that error appears in the above-identified patent and that said Letters Patent is hereby corrected as shown below:

Column 5, line 56; delete "101c" and insert -- 110c --.
Column 6, line 15; delete "is" and insert -- are --.
Column 6, line 26; delete "Control" and insert -- control --.
Column 6, line 47; delete "central" and insert -- control --.
Column 6, line 61; delete "100a, 100b and 100c" and insert --- 110a, 110b and 110c --.
Column 8, line 50; after "move" insert -- one of --.
Column 8, line 64; after "of" insert -- one of --.

Signed and Sealed this

Fourteenth Day of November, 1989

*Attest:*

JEFFREY M. SAMUELS

*Attesting Officer*        *Acting Commissioner of Patents and Trademarks*